Sept. 19, 1961 M. A. CHAPPEY 3,001,111

STRUCTURES FOR A FIELD-EFFECT TRANSISTOR

Filed Sept. 26, 1960 2 Sheets-Sheet 1

Sept. 19, 1961 M. A. CHAPPEY 3,001,111

STRUCTURES FOR A FIELD-EFFECT TRANSISTOR

Filed Sept. 26, 1960 2 Sheets-Sheet 2

3,001,111

STRUCTURES FOR A FIELD-EFFECT TRANSISTOR

Marc A. Chappey, 12 Blvd. Jean Mermoz, Neuilly-sur-Seine, France

Filed Sept. 26, 1960, Ser. No. 58,316
Claims priority, application France Sept. 30, 1959
6 Claims. (Cl. 317—235)

The invention concerns improvements in unipolar field-effect transistors and, more particularly, the construction of unipolar transistors with a very high limiting frequency, in which the length of the channel subjected to the field-effect is reduced to the thickness of the metallic deposit which constitutes the gate.

It is well known that the limiting frequency of oscillation and the slope of transconductance of the current-voltage characteristic of a field-effect transistor are respectively proportional to the quantities $W^{-2}$ and L/W in which W denotes the length of the channel region of the structure which, in the majority of unpolar transistors of the prior art is approximately equal to the width of the gate electrode and L denotes the length of the channel, evidently taken in the direction perpendicular to the current lines.

In the structure according to the invention, the gate electrode consists of two parallel electrodes, between which there passes the channel, the length W of which does not depend on the widths of the said two electrodes but on the thicknesses of their opposite sides.

In other words, owing to the process of manufacture which will be hereinafter described, the unipolar structure of the invention is obtained from a support of semi-conductive material of any geometrical shape on which, in accordance with an outline, also of any kind, the gate electrode is produced by two parallel grooves containing a semi-conductive alloy which is highly doped with suitable impurities.

The semi-conductive strip between the two grooves comprises an ohmic contact in order to form the source electrode and the support of the structure also comprises an ohmic contact for the production of a drain electrode. The place of this ohmic contact on the said support is so chosen that the current lines passing from the drain to the source are, in the channel, parallel to the sides of the two gate electrodes which are opposite each other.

The unipolar structure of the invention is manufactured by a known method which consists in depositing, by evaporation, in vacuo, on a silicon support of the n type for example, a metallic layer (aluminum for example) through a mask in accordance with the outline chosen for the two parallel grooves of the gate. The support is then placed in a furnace in which it is brought to a suitable temperature (higher than 577° C. in the case of silicon and aluminum taken as examples) in order to form two superposed layers of alloys at the place of the metallic deposit.

The layer, which is in contact with the silicon of the support and which fills the aforesaid grooves in order to form the two gate electrodes, consists of silicon of the p+ type which is highly doped with aluminum. The thickness of this layer (called recrystallized zone) and the depth to which it passes into the semi-conductive support depend upon the thickness of aluminum, which was initially deposited, and upon the temperature of the furnace.

The surface layer is the normal aluminum-silicon eutectic, which can be removed by immersion in a bath of hydrofluoric acid.

The features of the unipolar transistors of the invention will appear more clearly in the course of the following detailed description relating to certain forms of transistors which are taken as non-limitative examples and are represented by the accompanying drawings, of which FIG. 1 represents a known unipolar structure of the prior art, having annular electrodes;

(*a*) Edward George Roka's specifications entitled: "Improved Transistor" French Patent No. 1,129,770 of August 12, 1955 (American priority of August 17, 1954); "Unipolar Transistor Arrangement" (German Patent No. 1,034,272 of August 17, 1955;

(*b*) U.S. patent application, Serial No. 836,202 of August 26, 1959, patent granted on July 11, 1960 under No. 2,952,804 in the name of Joachim Immanuel Franke, entitled "Improvements in field-effect transistors."

Figure 1:
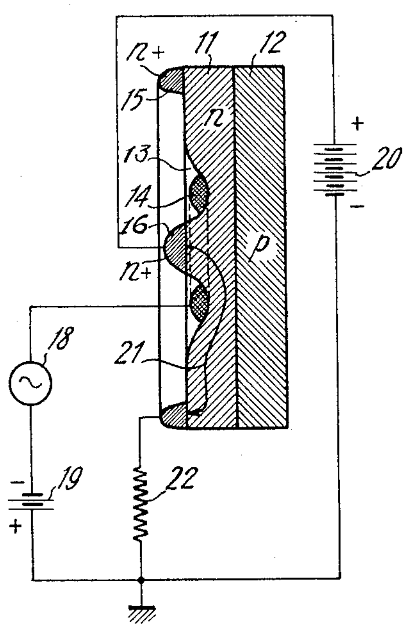
FIG. 1 is a diagrammatic representation of a field-effect transistor with annular electrodes, suggested by the structures of the prior art, which are described in numerous patent specifications, the principal ones of which are.

The structure shown in FIG. 1 consists of a thin circular plate of germanium having an n-p junction. The part 12 of p type is the thicker one in order to give the plate rigidity. The useful part 11 of n type has a thickness which does not exceed a few tens of microns. Hollowed in the obverse side of the plate 11 is a circular pit 13, in which a ring 14 of indium is arranged. The part of this ring which is in contact with the n-type germanium of the plate 11 constitutes a rectifying contact. The ring 14 is the gate of the field-effect transistor, the said gate being polarized oppositely (i.e. negatively in relation to the source) by the source 19 of direct current and modulated by the source 18 of alternating current. An electrode 16 is formed on the central part of the plate 11 by means of a deposit of germanium n+. Such a deposit behaves substantially like an ohmic contact and plays the part of a drain. This drain 16 is polarized by the source 20 of direct current. Arranged on the peripheral part of the plate 11 is an annular drain 15 of germanium n+ which is connected to earth through a load resistance 22 and plays the part of a source.

The operation of this structure and of the structures of the present application is obviously that indicated by W. Shockley in a well-known article entitled "A Unipolar Field-Effect Transistor" which appeared in the American magazine "Proceedings of the Institute of Radio Engineers," volume 40, November 1952, pages 1365 to 1376.

Figure 2:
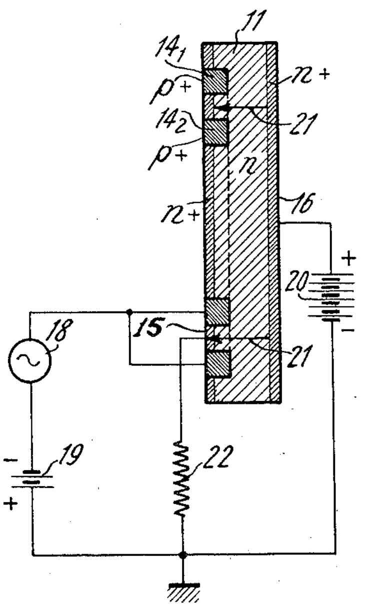
FIGS. 2 and 3 represent two different forms of a unipolar structure of the invention, which also comprises annular electrodes.

FIG. 2 gives an example of a structure according to the invention, the gate electrodes of which are annular. This example has been chosen in order to render it possible to compare the structure according to the invention with the annular-electrode structure of the prior art.

The plate 11, which is represented by FIG. 2, is a circular or square plate of n-type silicon of sufficient thickness to ensure the rigidity of the structure and doped to n+ at the surface by diffusion of impurities such as phosphorus, for example. On the obverse side of the plate 11, two annular electrodes $\mathbf{14}_1$ and $\mathbf{14}_2$ have been formed of silicon doped p+ with aluminum by the process hereinbefore described. These electrodes $\mathbf{14}_1$ and $\mathbf{14}_2$, which are connected together electrically by a metallic connection, constitute the gate of the unipolar transistor. This gate is oppositely polarized (i.e. negatively in relation to the source) by the source 19 of direct current. On the back of the plate 11 is arranged an ohmic contact 16 of large area, which constitutes the drain electrode that is polarized by the source 20 of direct current. The annular part 15 of the plate 11 between the sides of the two gate electrodes $14_1$ and $14_2$ is provided with an ohmic contact which constitutes the source and is connected to earth through the intermediary of a load resistance 22.

On comparing the respective lengths of the lines of current passing from the drain to the source for the structures of FIGS. 1 and 2, it is seen that the lines of current 21 of the structures of the prior art (FIG. 1) pass beneath the ring 14, whilst the lines 21 of the structure according to the present invention pass, in the region 15, between the two rings $14_1$ and $14_2$. This clearly shows, as has already been stated, that the length of the channel W of the structure of the prior art is in agreement with the radial width of the ring 14, whilst, for the structure according to the invention, the same length W of the channel is in agreement with the height of the sides of the rings $14_1$ and $14_2$.

The effect of the surface doping of the plate 11, in addition to the facility which it gives for the production of good ohmic contacts, both drain contacts and source contacts, is to reduce the extent of the space charges in the immediate vicinity of the surface, from which it results that pinch-off in surface is not favoured and is produced in the deepest part of the channel on the side of the drain; this avoids the troubles due to surface effects.

Figure 3:
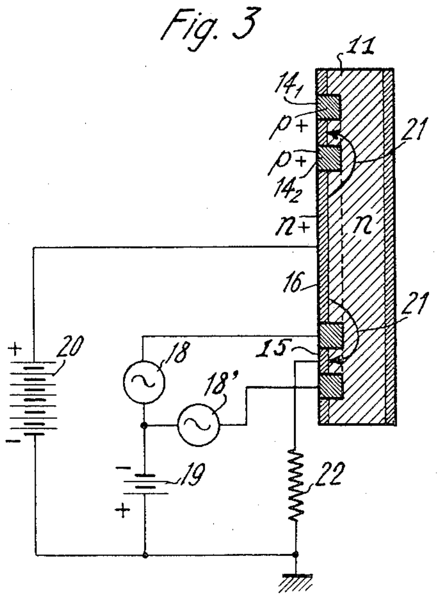

FIG. 3, in which the reference numerals have the same meaning as in FIG. 2, represents another embodiment of the foregoing structure, in which the drain is arranged on the obverse side of the plate 11 and no longer on its back. This arrangement renders it possible to obtain extremely short distances between the source and the drain independently of the thickness of the support 11. It is also seen, in FIG. 3, that it is sufficient to eliminate the connection between the two gate electrodes $14_1$ and $14_2$ and to modulate each of them separately by independent sources 18 and 18′ of alternating-current in order to render it possible for the structures hereinbefore described to operate, with double modulation, as a tetrode.

Figure 4:
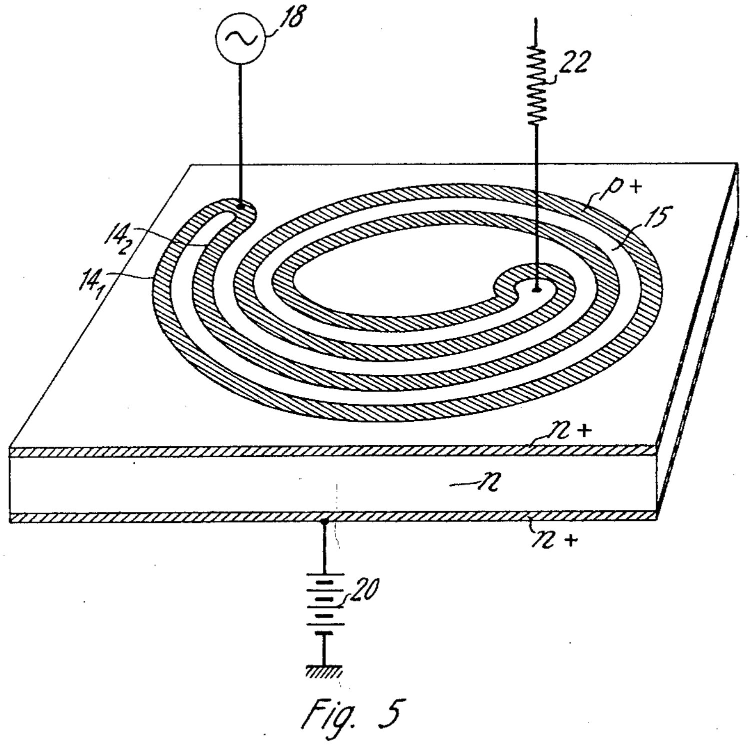
FIG. 4 represents another structure according to the invention, the outlines of the electrodes of which, instead of being circumferences, are spirals.

Rather than giving the gate electrodes the annular shape hereinbefore described, it is preferable to produce a gate $14_1$, $14_2$ with an outline of a spiral, as shown in FIG. 4, in which the parts, that are common to the structures represented in FIGS. 2 and 3, are denoted by the same reference numerals.

The advantage of the spiral (or of any other unclosed outline) is that it is possible to regulate the length of the gate electrode. For this purpose, it is sufficient to give the set consisting of the source 15 and the gate $14_1$, $14_2$ a length that is greater than the estimated length and then, in accordance with the indications of the checking measuring apparatus, to shorten the said length with the aid of a metallic deposit which covers, at the same time, the parts of the ends of the source 15 and of the gate $14_1$, $14_2$ which have become useless.

The structures hereinbefore defined render it possible to produce unipolar transistors of very high electric performances owing to the low resistance of the path through which passes the current that passes through the transistors and to the very low capacity of their junctions owing to the very small extent of the space charges that are necessary for the pinch-off of their channel. In order to bring these performances to their maximum, the principal factors on which it is necessary to act with great care are the thickness of the support 11 (when the drain is on the back of the latter), the length, the width, the distance apart and the depth of the gate electrodes $14_1$ and $14_2$, as well as the depth and the gradient of the diffusion of phosphorus.

Figure 5:
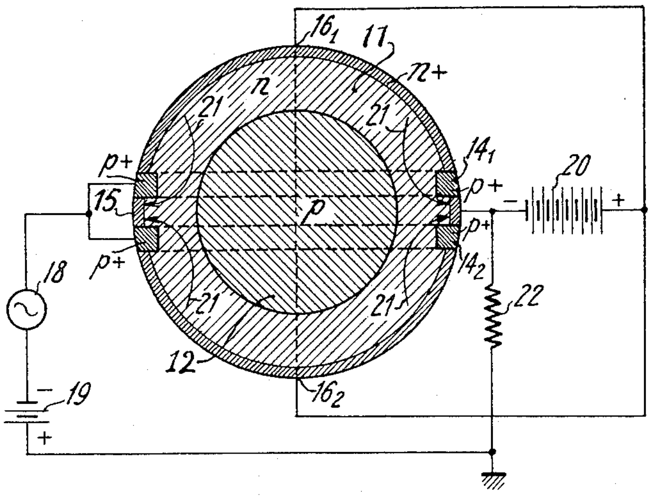
FIG. 5 represents a unipolar transistor with an unpolarized supporting core, converted in accordance with the invention.

The considerations hereinbefore set forth may extend to structures of very different geometrical forms. By way of example, FIG. 5 shows their application to the "Unipolar transistor with an unpolarized supporting core," the subject matter of French Patent No. 1,224,245 of February 5, 1959 in the name of the present applicant. This unipolar transistor is constituted by a ball of p-type silicon which is entirely covered, by diffusion, with an n-type layer of a uniform and controlled depth. The diffusion is carried out in such a manner that the external surface of this n-type layer is highly doped n+. In the initial structure of the sphere thus constituted, its polar caps being covered by a suitable mask, its equatorial periphery is subjected to a metallization which produces there a semi-conductive layer of the p+ type. The transistor obtained is provided with three ohmic contacts, two of which, that are welded respectively to the poles of the polar caps, constitute its source and its drain and the third, which is welded on the equatorial strip of the p+ type, constitutes its controlling gate.

FIG. 5 shows the modifications which it is necessary to cause the transistor to undergo, the description of which has just been recalled, in order to obtain a structure according to the invention. The spherical core 12 of silicon, being as hereinbefore indicated, entirely covered with a semi-conductive layer 11 of the n type, the equatorial gate should be replaced by two parallel electrodes $14_1$ and $14_2$ which are situated on one side and the other of the equatorial plane of the sphere and at equal distances from the latter. These two electrodes are obtained, as hereinbefore indicated, by metallization through slots made in suitable masks. Under these conditions, it is the equatorial strip 15 which, provided with an ohmic contact, constitutes the source of the transistor which is connected to earth through the load resistance 22.

The two ohmic contacts $16_1$ and $16_2$ are respectively welded on the polar caps and connected together to the positive pole of the source 20 of anode voltage. The two gates $14_1$ and $14_2$ are connected together electrically by a metallic and are polarized by the source 19 of direct current. It is seen that the current lines 21, which pass from the polar caps (which are substantially equipotential owing to their great surface conductivity) to the equatorial source 15, cross radially the channel formed between the sides of the electrodes $14_1$ and $14_2$.

I claim:

1. An unipolar field-effect transistor for very high frequencies comprising within a single body of semiconductive material a channel region having source and drain connections, and a gate region forming a junction therewith, said gate region having the configuration of two parallel thin strips of a given thickness separated by a narrow region, said source connection being directly connected to said narrow region and said drain connection having a large area of contact with at least one portion of said body which is external to said gate and said narrow regions whereby said channel region is included between said parallel thin strips and has a length substantially reduced to the thickness of said strips.

2. An unipolar field-effect transistor for very high frequencies comprising within a single body of semiconductive material having the configuration of a wafer of rectangular section, a channel region having source and drain connections and a gate region forming a junction therewith, said gate region being included in a first face of said wafer and having the configuration of two parallel thin strips separated by a narrow region, said source connection being connected to said narrow region and said drain connection having a large area contact with the face of said wafer opposite to said first face.

3. An unipolar field-effect transistor according to claim 2 in which said gate region has the configuration of two concentric circular thin strips.

4. An unipolar field-effect transistor according to claim 2 in which said gate region has the configuration of two parallel portions of spiral connected together by their both ends.

5. An unipolar field-effect transistor for very high frequencies comprising within a single body of semiconductive material having the configuration of a wafer of rectangular section, a channel region having source and drain connections and a gate region forming a junction therewith, said gate region being included in a given face of said wafer and having the configuration of two concentric circular thin strips separated by a narrow circular interval and delimitating a common central region, said source connection being connected to said interval and said drain connection having a large area contact with said given face in said common central region.

6. An unipolar field-effect transistor for very high frequencies cvomprising within a single substantially spherical body of semiconductive material, central and superficial regions of opposite conductivity type, said central region being an unipolarized supporting core and said superficial region being a layer of uniform depth comprising a channel region having source and drain connections and a gate region forming a junction therewith, said gate region having the configuration of two parallel circular thin close-spaced strips located on one side and the other of an equatorial plane of said spherical body and separated by a narrow equatorial strip, said source and drain connections being connected to said superficial region respectively in said equatorial strip and in the middle part of the polar caps delimited by said gate region.

References Cited in the file of this patent

UNITED STATES PATENTS

| | | |
|---|---|---|
| 2,697,052 | Dacey et al. | Dec. 14, 1954 |
| 2,754,431 | Johnson | July 10, 1956 |
| 2,778,885 | Shockley | Jan. 22, 1957 |
| 2,778,956 | Dacey et al. | Jan. 22, 1957 |
| 2,820,154 | Kurshan | Jan. 14, 1958 |
| 2,869,055 | Noyce | Jan. 13, 1959 |
| 2,952,804 | Franke | Sept. 13, 1960 |
| 2,971,140 | Chappey et al. | Feb. 7, 1961 |
| 2,987,659 | Teszner | June 6, 1961 |